US012798194B2

(12) United States Patent
Fornos Martinez et al.

(10) Patent No.: US 12,798,194 B2
(45) Date of Patent: Nov. 17, 2026

(54) MANAGEMENT OF PRINTER CONTROL FLUIDS

(71) Applicant: Peridot Print LLC, Palo Alto, CA (US)

(72) Inventors: Pol Fornos Martinez, Sant Cugat del Valles (ES); David Ramirez Muela, Sant Cugat del Valles (ES); Ismael Fernandez Aymerich, Sant Cugat del Valles (ES)

(73) Assignee: Peridot Print LLC, Palo Alto, CA (US)

( * ) Notice: Subject to any disclaimer, the term of this patent is extended or adjusted under 35 U.S.C. 154(b) by 881 days.

(21) Appl. No.: 17/634,868

(22) PCT Filed: Aug. 28, 2019

(86) PCT No.: PCT/US2019/048544

§ 371 (c)(1),
(2) Date: Feb. 11, 2022

(87) PCT Pub. No.: WO2021/040704

PCT Pub. Date: Mar. 4, 2021

(65) Prior Publication Data

US 2022/0332053 A1 Oct. 20, 2022

(51) Int. Cl.

| | |
|---|---|
| ***B29C 64/393*** | (2017.01) |
| ***B29C 64/165*** | (2017.01) |
| ***B29C 64/264*** | (2017.01) |
| ***G06F 3/12*** | (2006.01) |
| *B33Y 10/00* | (2015.01) |
| *B33Y 30/00* | (2015.01) |
| *B33Y 50/02* | (2015.01) |

(52) U.S. Cl.
CPC .......... *B29C 64/393* (2017.08); *B29C 64/165* (2017.08); *B29C 64/264* (2017.08); *G06F 3/1205* (2013.01); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS 6,261,507 B1 7/2001 Gigi et al.
9,440,397 B1 * 9/2016 Fly ........................ B29C 64/171
(Continued)

FOREIGN PATENT DOCUMENTS

WO WO-2016175817 A1 11/2016

*Primary Examiner* — Carlos R Ortiz Rodriguez
(74) *Attorney, Agent, or Firm* — Law Offices of Michael Dryja; Michael Dryja

(57) ABSTRACT

Disclosed are systems, control mechanisms and methods that apply different printer control fluid parameters when forming internal and external features of a three-dimensional object within an additive manufacturing system. The identification of internal and external features may involve analysing an object model, comprising data describing the object to be manufactured, to identify all edges of a three-dimensional object and determining which of the edges are internal edges and which are external edges of the object. A control fluid strategy can be optimised for different object feature types, to improve mechanical properties of the final object and/or reduce usage of detailing agent.

18 Claims, 4 Drawing Sheets

(56) References Cited

U.S. PATENT DOCUMENTS

| | | | |
|---|---|---|---|
| 10,259,041 | B2 | 4/2019 | Gessler et al. |
| 2007/0238056 | A1* | 10/2007 | Baumann ................ B22F 12/41 430/325 |
| 2017/0239902 | A1 | 8/2017 | Sterman et al. |
| 2018/0022923 | A1 | 1/2018 | Emamjomeh et al. |
| 2018/0050486 | A1 | 2/2018 | Talgor et al. |
| 2018/0104894 | A1* | 4/2018 | Fung ........................ C08K 3/04 |
| 2018/0111194 | A1 | 4/2018 | Buller et al. |
| 2018/0272560 | A1 | 9/2018 | Abbott et al. |
| 2018/0354191 | A1* | 12/2018 | Nauka ................... B29C 64/264 |
| 2019/0047047 | A1 | 2/2019 | Mark |
| 2019/0047216 | A1 | 2/2019 | Emamjomeh et al. |
| 2019/0177473 | A1 | 6/2019 | Bashir et al. |

* cited by examiner

MANAGEMENT OF PRINTER CONTROL FLUIDS

BACKGROUND

Three-dimensional (3D) printing can be implemented using a variety of additive manufacturing processes in which successive layers of material are formed to build a three-dimensional solid object from a digital object model or specification. Objects such as product components can be built up in layers in an additive manufacturing system using fusing, binding or solidification, in accordance with object descriptions that are interpreted and applied by a print controller.

In an example additive manufacturing process using printer control fluids, a fusing agent (FA) fluid can be used to promote a build powder's absorption of energy from an energy source, to promote heating, melting, and fusing of the build powder, and a detailing agent (DA) fluid can be used adjacent to the fusing agent fluid to inhibit unwanted fusing of adjacent powder. The FA has the effect of raising the temperature of the build powder when irradiated by the energy source, and the DA has the effect of reducing the heating effect of this radiation on build powder that it is applied to, providing highly localised control of powder fusing.

The quality, strength and functionality of objects built in additive manufacturing systems vary according to the technology which is used.

BRIEF DESCRIPTION OF DRAWINGS

Example methods, apparatus and computer program products are described in detail below, by way of example only, with reference to the accompanying drawings in which.

DETAILED DESCRIPTION

Figure 1A:
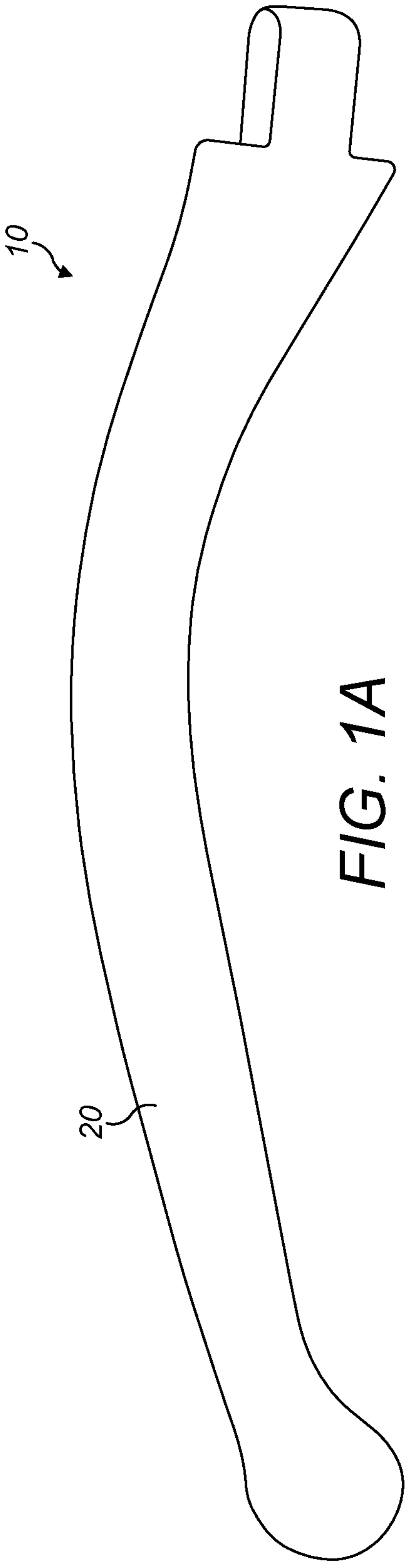
FIG. 1 is a representation of an example product part, showing its exterior surface in FIG. 1A and showing its internal structure in the cross-section of FIG. 1B.

An example additive manufacturing system can form three-dimensional objects in layers by delivering successive layers of a build material to a build unit and selectively heating specified portions of each layer so as to fuse the specified portions of the build material—e.g. fuse particles of a build powder at specific locations. References to 'fusing' herein include sintering, and melting followed by solidification on cooling, and other binding or coalescence mechanisms.

A set of background heaters may be used to pre-heat a build material powder in a build unit of an additive manufacturing apparatus to a uniform starting temperature, and then an energy source is used to irradiate the top layer of build material powder to raise the temperature to a fusing temperature at specified locations only—the fused portions become a layer of the object being manufactured, and non-fused portions can be removed at the end of the printing process.

In an example method of additive manufacturing as described above, printer control fluids are used to increase or decrease the temperature of a build material by promoting or inhibiting the absorption of radiation from an energy source. In a particular example, the fusing process is controlled using a fusing agent that promotes fusing at desired locations by increasing absorption of energy from incident radiation and converting it to thermal energy, and using a detailing agent that inhibits fusing at locations adjacent the desired fusing locations through cooling effects. For example, the detailing agent may include a colorant that has low absorbance for radiation of certain wavelengths and so the colorant inhibits absorption of energy from the source of radiation if relevant wavelengths are used. Alternatively, the detailing agent may be a liquid that cools build powder through evaporative cooling. The detailing agent may be a water-based detailing agent that works by evaporative cooling and causes no significant contamination of the build material, enabling reuse of unfused build powder to reduce manufacturing costs.

The fusing agent and detailing agent are selectively deposited at chosen locations. Fusing agent is applied generally to all areas that are to be fused, and detailing agent may be applied around a boundary of an area to be fused to prevent a "thermal bleed" that would cause melting and fusing of build material outside the intended boundary. The identification of locations to receive detailing agent can be based on an evaluation of each voxel of a three-dimensional object model (i.e. considering a 3D volume as a regular 3D grid of volume elements or 'voxels' that can each be evaluated). When evaluating a 3D object model, each layer can be evaluated in turn (as a 2D slice of the 3D object model), and each voxel location within a new layer can be evaluated separately based on a thermal model and/or thermal feedback from a thermal camera. For example, to prevent overheating, less fusing agent may be applied in one location based on an amount of fusing agent applied in a previous layer.

A detailing agent may be applied at an object boundary to enhance edge definition of an object (i.e. the boundary can be formed using a fusing agent on one side of the boundary and a detailing agent on the other side). Each of the fusing agent and detailing agent penetrate into the top layer of build material on a respective side of the edge boundary. As well as inhibiting energy absorption when irradiated, the detailing agent may act to prevent bleeding of the fusing agent into unintended regions of the build material. A detailing agent may also be used to control the fusing process itself to prevent overheating, by applying a detailing agent at the same locations where fusing agent is also applied, to cool specific regions (in addition to the application of detailing agent without fusing agent at locations on the other side of an object boundary to achieve edge definition).

When the build material layer is irradiated after depositing the fusing control fluids, the fusing agent absorbs energy and promotes fusing for build material locations on one side of the edge boundary, and the detailing agent inhibits fusing for locations in neighbouring portions of the build material on the other side of the edge boundary. This improves edge definition and dimensional accuracy compared with the use of only a fusing agent, and so reduces the need for mechanical or chemical refining processes after building the object.

This use of a plurality of control fluids that influence the temperature of an irradiated build material can allow controlled additive manufacturing of three-dimensional objects to correspond with an object model, when the object model is interpreted by a controller of the additive manufacturing system—i.e. the controller interprets input data that is a digital representation of the desired three-dimensional object and controls the manufacturing system to provide a physical representation.

Figure 1B:
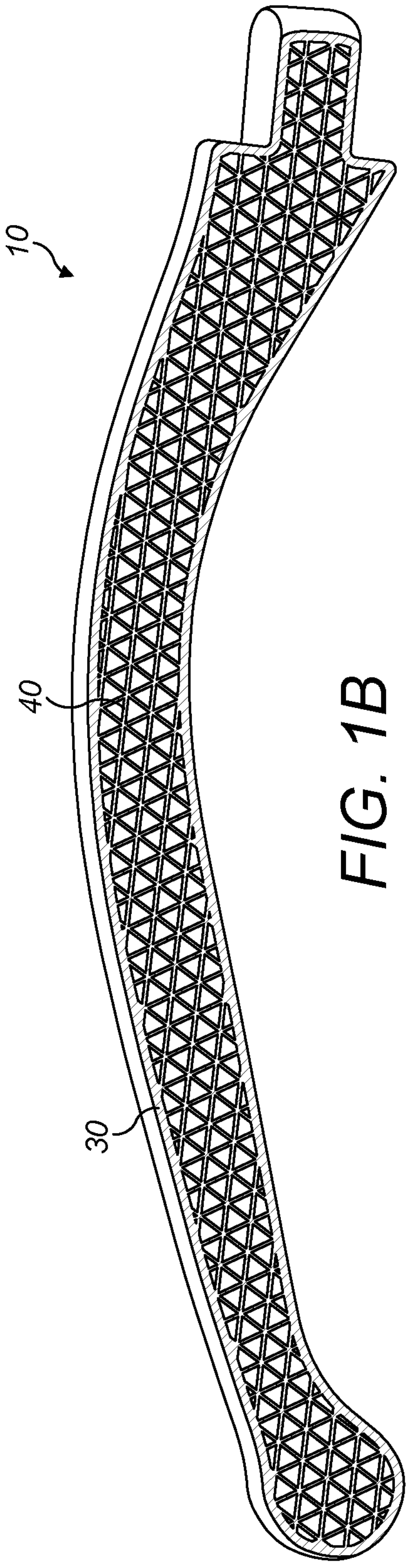

The object model may include, for each object, data representing an outer shell defining an object's surface features and internal structure features that are intended to provide structural support for the outer shell. FIG. 1A shows the exterior surface features 20 and FIG. 1B shows the outer shell 30 and internal structure 40 in cross-section of an example three-dimensional object 10. The precision with which the outer shell surface is formed is often evaluated and accepted as an indication of manufacturing quality.

In a known example of an additive manufacturing system, each object's internal structures are treated in the same way (i.e. aiming to achieve the same level of conformance to the object model, and using the same fusing control fluids) as the surface features of the object's external shell—without differentiating between them. Thus, gaps in the defined internal structure are interpreted as holes that should not contain fused powder, and a detailing agent is used to keep the holes clear of fused powder. For example, if the object model includes small holes and a thin lattice structure as shown in FIG. 1B, this is formed using the same printer control fluid strategy to conform to the object model regardless of whether it is an external feature or an internal feature. The present inventors have identified some undesirable outcomes from this approach, especially for lattices with small cell dimensions which are demanding in terms of the use of detailing agent to keep the holes of each cell clear of fused powder to match the object model.

Although high levels of detailing agent can be used to achieve clean holes when this is desired, the fusion-inhibiting (cooling) effect of excessive detailing agent can also create structural weaknesses or other defects in a manufactured object. Depositing too much detailing agent into a confined internal space when forming lattices of thin-walled cells can inhibit desired fusing of the thin cell walls (as well as successfully inhibiting undesired fusing). The present inventors have determined that high use of detailing agent is unnecessary for the internal features of many objects, and can result in defects such as bubbles or "sinks" (collapse of a surface region due to structural weakness), as well as incurring avoidable costs when excessive amounts of detailing agent are used.

In particular, the inventors have determined that there are many objects for which some additional fusing of non-visible internal structure features would be acceptable and could even improve the mechanical properties of the manufactured objects, such that the cooling effect of the detailing agent can or should be reduced or avoided when forming object features of a certain type. A reduced use of detailing agents can also reduce physical wear of components, such as a printhead, used to deposit the detailing agents.

The present inventors have developed control mechanisms and processes that differentiate between different types of structural feature of a three-dimensional object, and adapt the fusing control fluid parameters to control the manufacturing process differently for these different feature types. The fluid strategy can be optimised for different features of an object during a manufacturing process, based on an identification of object features of different types, to improve mechanical properties of the final object and/or reduce usage of detailing agent. This has the potential to improve overall object quality and to reduce one of the costs of manufacturing.

Figure 2:
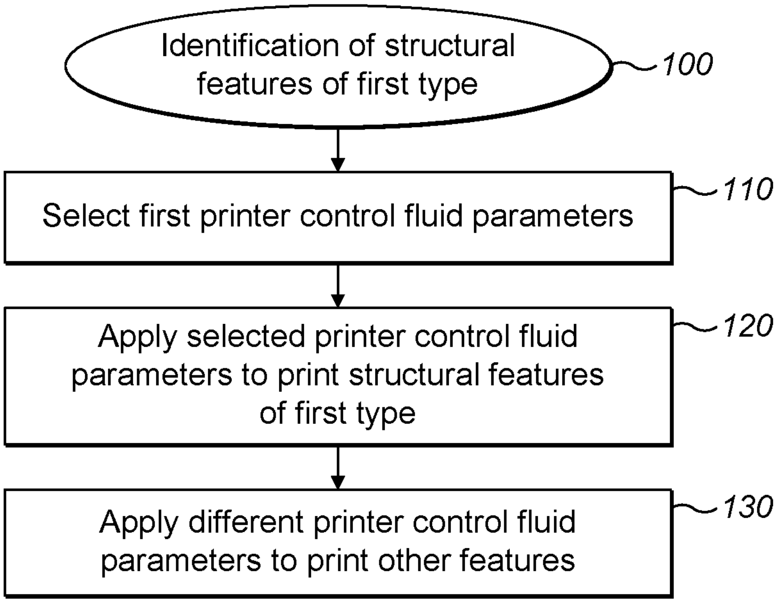
FIG. 2 is a flow diagram representing an example method of generating printer control instructions.

In an example method described in detail herein and shown in FIG. 2, printer control instructions are generated for use by a controller of a three-dimensional printing apparatus, to control the apparatus to:

a. select 110 a first set of printer control fluid parameters, in response to identification 100 of a first type of structural feature of a three-dimensional object that is to be manufactured, for use when printing the structural features of the first type; and
b. apply 120 the selected printer control fluid parameters when printing the structural features of the first type; and
c. apply 130 different printer control fluid parameters when printing features other than the structural features of the first type.

In an example method, printer control instructions are generated for use by a controller of a three-dimensional printing apparatus, to control the apparatus to:

d. identify 200, 205 internal features and external features of a three-dimensional object, prior to or during manufacture by the three-dimensional printing apparatus;
e. select 210 a first set of printer control fluid parameters for forming internal features and select a second set of printer control fluid parameters for forming external features;
f. apply 220 the selected first set of printer control fluid parameters when forming internal features of the three-dimensional object; and
g. apply 230 the selected second set of printer control fluid parameters when forming external features of the three-dimensional object.

The identification of internal and external features may involve analysing an object model, comprising data describing the object to be manufactured, to identify 200 all features that are contained within an external shell of the object and all features that are external surface features.

Thus, a printer controller is configured by instructions that can be implemented in program code to identify structural features of a first type and to treat the identified type of features differently from other features. The structural features of the first type could be all internal features including any edges or surfaces that are within an external shell of the object, which are then handled differently from external features, or the controller could differentiate between specific types of internal feature to enable special treatment of features such as small voids/holes and thin lattices that are contained within an outer shell of the product. Equally, the structural features of the first type could be external surface features, with a first set of printer control fluid parameters being selected for printing features of the first type and different parameters being applied when printing other features including features having edges/surfaces enclosed within the outer shell.

Example methods can involve setting a different level of conformance to the object model for some object features compared with other object features—according to the type of structural feature and its intended properties within the finished object. The different treatment could involve using no detailing agent or a limited quantity of detailing agent for internal features of the object, for which rough edges and surfaces are acceptable and structural integrity is more desirable than surface smoothness, but using a larger quantity of detailing agent for external surface features of the object for which compliance with the object model is more desirable. This selective application of printer control fluids can avoid excessive use of detailing agent that might otherwise inhibit desired fusing within the internal structure and weaken the structure; this can have undesirable consequences when a detailing agent is used to inhibit fusion adjacent to a thin internal lattice structure, for example.

Thus, specific features could suffer from inadequate fusing when employing a uniform control fluid strategy for all internal and external features including features such as internal lattice structures and holes. Instead of seeking equal compliance with an object model for all parts of an object, some object features can receive special treatment including use of a fusing agent without a detailing agent, or selective reduced use of detailing agent.

Figure 3:
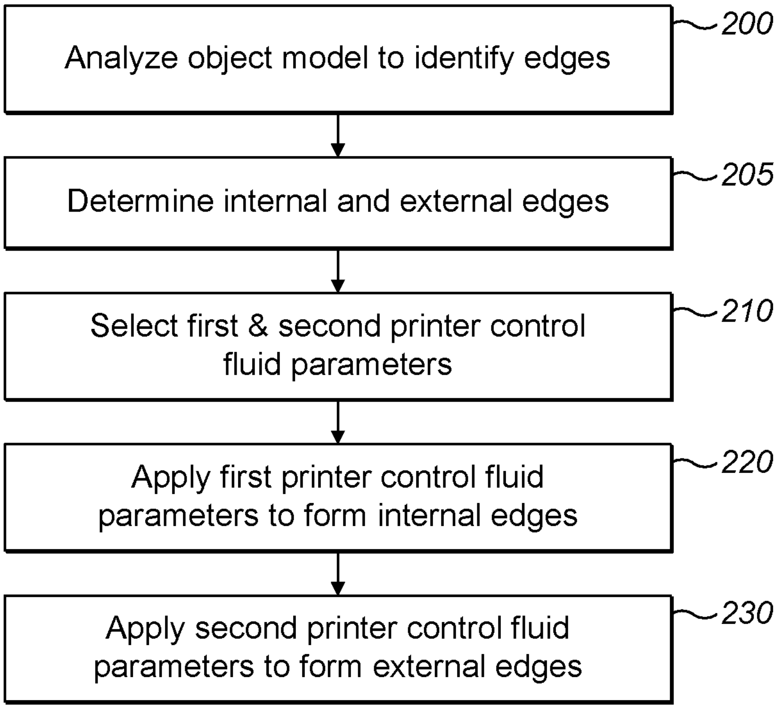
FIG. 3 is a flow diagram representing an example method of generating printer control instructions.

As shown in FIG. 3, which is a possible implementation of the method of FIG. 2, the method can involve analyzing 200, 205 data representing a three-dimensional object that is to be manufactured, to identify specific types of structural feature, including identifying (200) edges and other surface features and determining (205) which features are fully contained within the outer shell of the object. This analysis can be used to categorize internal and external features. The printer controller may include program code to analyze the object model (data representing a three-dimensional object that is to be manufactured) to identify voxels that are fully contained within the object's external shell; and identifying these voxels as part of an internal feature of the object. The printer controller can then select 210 a first set of printer control fluid parameters for use when printing 220 these internal structure features, and select different printer control fluid parameters or use a default set of parameters when printing 230 external surface features of the object's external shell.

In an example, program code within a controller of a 3D printing apparatus analyzes object models to identify features that will be fully contained within an outer shell of the manufactured object, and flags such features as 'internal' features that are to be treated differently from external surface features. In an example, different geometries of internal features are used to determine the printer control fluid parameters, such as how much detailing agent to use. In an example, no detailing agent is used when printing internal features that have small internal spaces—i.e. when the number of voxels representing a hole between structural features is below a threshold, and when the thickness of an internal feature is less than a threshold number of pixels.

Such analysis of an object model, followed by adaptive 3D printing in response to identification of at least a first type of structural feature, avoids the need for the object model itself (or a user of the three-dimensional printing apparatus) to explicitly identify features of the first type and other types.

In an alternative implementation of the method, the identification of structural features of the first type is provided 100 as part of the object model itself, and in that case the controller is adapted to interpret such explicit identifications as instructions to control the 3D printing apparatus to apply different treatment to the identified first type of features and other features.

The selection of printer control fluid parameters for printing identified object features of the first type can involve an automated decision to use different amounts of detailing agent for different types of feature, such as to use no detailing agent for internal features, and only to use detailing agent adjacent to external surface features for which precision and smoothness are desired. This could be implemented so as to use no detailing agent for any internal features, or to use no detailing agent for some types of internal structural feature such as internal lattice structures that are fully contained within an object's external shell.

Avoiding the use of detailing agent for some types of structural feature may allow the absorbed thermal energy to spread (or 'bleed') into adjoining areas of the build powder, as well as losing the cooling effect of the detailing agent itself. This can cause increased absorption of energy when those areas of the build powder are irradiated, and therefore increased fusing in a region of the build material adjoining the intended fusion region. Although this may result in more fusion of build material, and internal features having rough edges and not being as precisely defined as some other features, this internal roughness is acceptable for many objects and the limited use of detailing agent may avoid potential defects such as a collapse or "sink" of an external surface and weaknesses that can be caused by the fusion-inhibiting effect of having excessive detailing agent in confined internal spaces.

Thus, a selective application of detailing agent in response to identification of certain different types of structural feature, which differentiates between external surface features and internal support structures, can optimise the manufacturing process to ensure that each feature and the final manufactured object achieves its intended purpose. A detailing agent can be omitted when building some object features, supplied with a maximum loading, e.g. 255 contone, when building some features, and supplied within the range 0-255 contone when building other object features, depending on the structural geometry and purpose of each object feature.

Figure 4A:
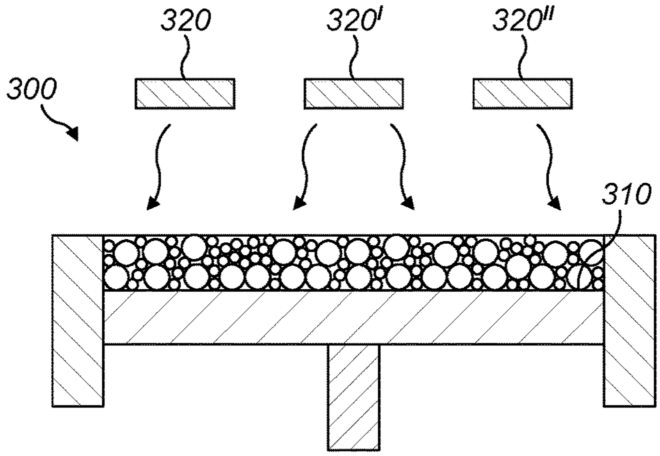
FIGS. 4A, 4B, 4C are schematic representations of physical components of an example 3D printing apparatus.
Figure 4B:
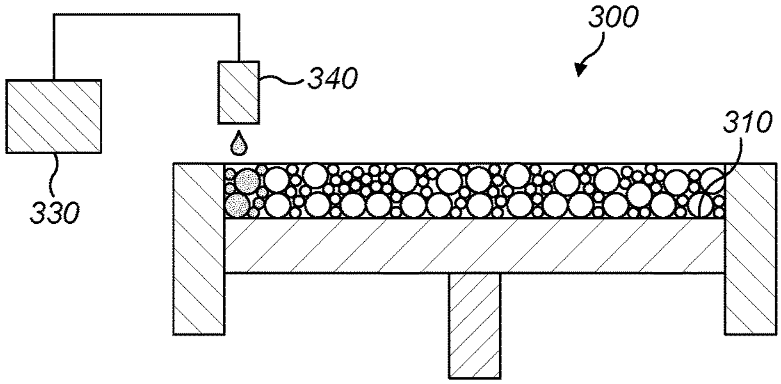
Figure 4C:
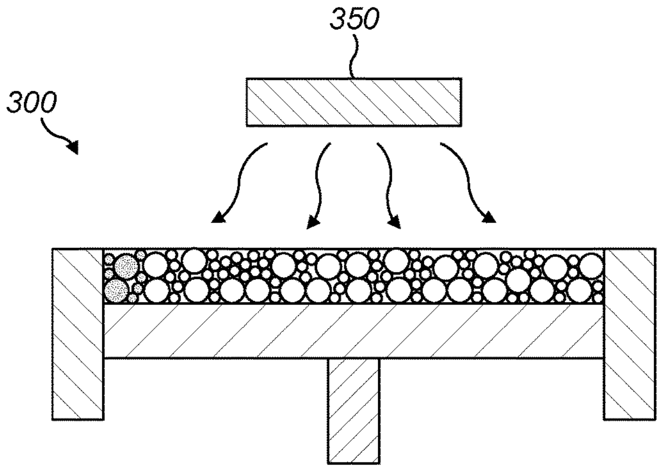
Figure 5:
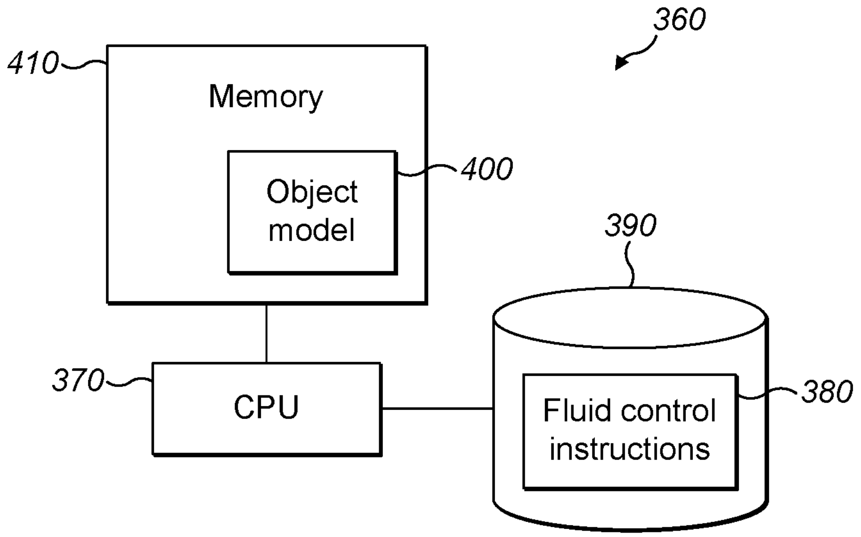
FIG. 5 is a schematic representation of the control system of an example 3D printing apparatus.

The example methods of FIGS. 2 and 3 can be implemented in an additive manufacturing system such as shown schematically in FIGS. 4A, 4B, 4C. A printing system 300 for forming the 3D object includes a build unit providing a fabrication bed 310, overhead heaters 320, 320', 320", fluid reservoirs 330 containing fusing control fluids (fusing agent and detailing agent respectively) and corresponding printheads 340, and an energy source 350 for irradiating the build material for controlled heating after control fluids have been deposited. Referring to FIG. 5, the build unit is controlled by a controller 360 that includes a central processing unit 370 and instructions 380 held in a non-transitory storage medium 390 of the printing system 300. The central processing unit 370 is able to execute computer readable instructions 380 stored in the non-transitory storage medium, to control the physical components of the additive manufacturing system (3D printing system) 300 to build a 3D object in accordance with an object model 400 that is saved to system memory 410 for processing.

The object model 400 provides data that describes the particular object to be manufactured, and this data is used for controlling the delivery and heating of the build material and the selective delivery of the fusing agent and the detailing agent, in accordance with the object model itself and the printer control instructions saved in non-transitory storage 390. The instructions in storage 390 include instructions 380 for the selection of different printer control fluid parameters in response to identification of different types of structural feature, such as internal and external features.

Figure 6:
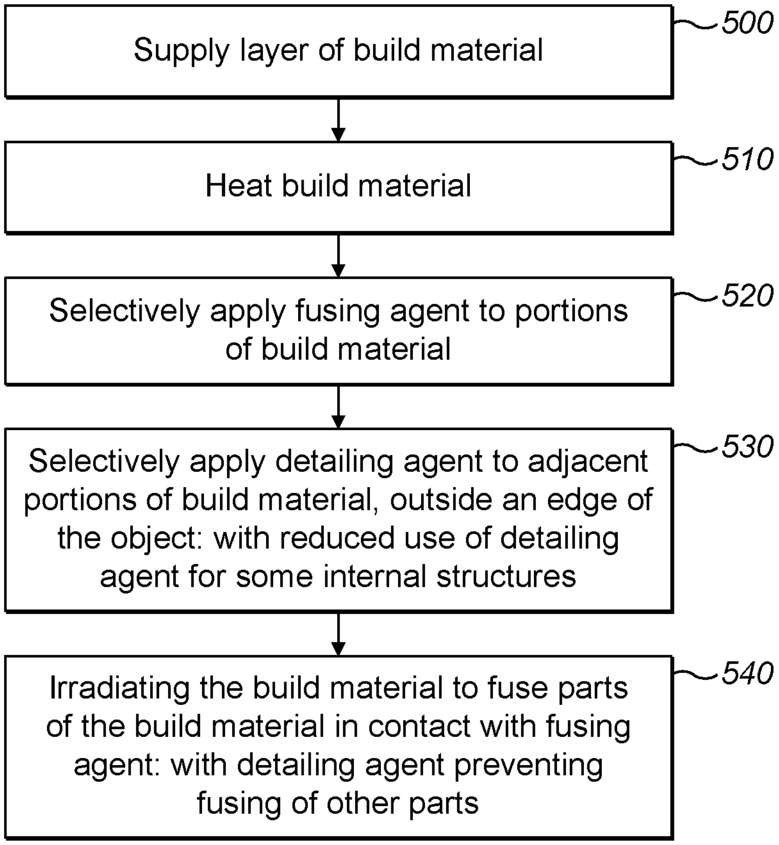
FIG. 6 is a flow diagram representing an example method of additive manufacturing.

In an example represented in FIG. 6, when a first layer of the 3D object is to be formed, a delivery piston may be controlled to supply 500 a predetermined amount of the build material from a supply reservoir or bed to the fabrication bed 310 such as that shown in FIG. 4A. A roller or blade can be used to spread the build material into the fabrication bed to form a layer of build material of relatively uniform thickness. In an example, the thickness of the layer may range from about 50 µm to about 200 µm, potentially about 90 µm to about 110 µm, although thinner or thicker layers may also be used.

After the layer of the build material is deposited in the fabrication bed 310, the layer is exposed to heating 510, to pre-heat the build material to a temperature that remains below the melting point of the build material. The temperature selected will depend upon the build material that is used. As examples, the heating temperature may be from about 5° C. to about 50° C. below the melting point of the build material. In an example, the heating temperature ranges from about 50° C. to about 400° C. In another example, the initial heating temperature ranges from about 150° C. to about 170° C.

Pre-heating 510 the layer of the build material may be accomplished using any suitable heat source that exposes all of the build material in the fabrication bed to the heat. Examples of the heat source include a thermal heat source or an electromagnetic radiation source e.g. infrared, microwave, etc.

After pre-heating the layer, the fusing agent is selectively applied 520 to one or more portions of the build material in the layer, where fusing is to be carried out, as shown in FIG. 4B and FIG. 6. As illustrated in FIG. 4B, the fusing agent may be dispensed from a printhead. While a single printhead is shown in FIG. 4B, it is to be understood that multiple printheads may be used. The printhead may be attached to a moving XY stage or a translational carriage, neither of which is shown, that moves the printhead adjacent to the fabrication bed in order to deposit the fusing agent at desired locations.

The printhead may be controlled to receive print data from the central processing unit and to deposit the fusing agent on the layer of build material at desired locations to absorb radiation and form a layer of the 3D object. In the example shown in FIG. 4B, the printhead selectively applies the fusing agent on those portion(s) of the layer that are to be fused to become a layer of the 3D object.

A detailing agent is also selectively applied 530 to portions of the build material layer alongside the portions that are to be fused, in accordance with control fluid parameters that are selected for the particular features being printed. In one example, a print controller for an additive manufacturing system comprises computer program instructions for controlling the additive manufacturing apparatus to:

h. select a first set of control fluid parameters, in response to identification of a first type of structural feature of a three-dimensional object that is to be manufactured, for use when building the structural features of the first type; and
i. apply the selected printer control fluid parameters when building the structural features of the first type; and
j. apply different printer control fluid parameters when building features other than the structural features of the first type.

The print controller may select different printer control fluid parameters, such as different amounts of detailing agent or different detailing agent fluids, for each of two or more different types of object feature. In an example, the print controller applies a reduced amount of detailing agent to certain types of internal feature. The determination of printer control fluid parameters for each layer of the build material may take account of the previous and subsequent layers of a 3D object model, so that the application of fusing agent and detailing agent is optimised for each build layer based on evaluation of the 3D object model, rather than a single 2D slice of the 3D model being evaluated in isolation. For example, formation of a feature of an object may involve selective application of detailing agent across a number of layers of build material with the parameters selected for adjacent layers being dependent on each other.

A controller as described above may include instructions for analysing input data representing a three-dimensional object to identify internal structure features, and instructions for selecting a first set of control fluid parameters in response to said identification of internal structure features. Another example controller includes instructions for responding to input data explicitly identifying internal structure features, by selecting the first control fluid parameters. Another example controller includes instructions for responding to user input data specifying the first control fluid parameters to be applied when manufacturing features identified as internal structure features.

After applying the fusing agent and detailing agent, the build material layer is irradiated 540 by an energy source to raise the temperature of portions of the build material layer that are in contact with the fusing agent to exceed the melting temperature of the build material. These portions of the layer of build material are fused.

An example computer-readable recording medium comprises instructions that, when executed by a processor communicatively coupled to an additive manufacturing system, cause the additive manufacturing system to perform a method as described above—i.e. to select a first set of control fluid parameters, in response to identification of a first type of structural feature of a three-dimensional object that is to be manufactured, for use when building the structural features of the first type; apply the selected printer control fluid parameters when building the structural features of the first type; and apply different printer control fluid parameters when building features other than the structural features of the first type.

Various materials, fusing times and temperatures may be employed in the methods described herein.

Examples of suitable fusing agents are water-based dispersions including a radiation absorbing binding agent (i.e., an active material). The active material may be near infrared light absorber. As examples, the active material may be any near IR dye or pigment. The dye or pigment in the fusing agent may be any colour. As one example, the fusing agent may be an ink-type formulation including carbon black as the active material. An example of this ink-type formulation is commercially known as CM997A available from HP Inc. Examples of other pigment based inks include the commercially available inks CM993A and CE042A, available from HP Inc.

The aqueous nature of the fusing agent enables the fusing agent to penetrate, at least partially, into the layer of the build material. The build material may be hydrophobic, and the presence of a co-solvent and/or a surfactant in the fusing agent may assist in obtaining desirable wetting behaviour.

It is to be understood that a single fusing agent may be selectively applied to form the layer of the 3D object, or multiple fusing agents may be selectively applied to form the layer of the 3D object.

After the fusing agent(s) is (are) selectively applied to desired locations, a detailing agent can also be selectively applied at locations alongside the fusing agent, to keep the build powder adjacent the fused portion below the melting temperature (for example by 20 degrees C.), through an evaporative cooling process. According to one example, a suitable detailing agent may be a formulation commercially known as V1Q61A "HP detailing agent" available from HP Inc. The detailing agent may include a, a surfactant, a co-solvent, and a balance of water. In some examples, the detailing agent includes these components, and no other components, but in other examples the detailing agent includes other specific components, such as additional colorants (e.g., pigment(s)). In some other examples, the detailing agent further includes an anti-kogation agent, a biocide, or combinations thereof. It has been found that this particular combination of components effectively reduces or prevents coalescence bleed, where needed. In addition, the detailing agent prevents or reduces undesirable cosmetic effects (e.g., colour and white patterns) by adding the colorant, which diffuses into and dyes the build material particles at least at the edge boundary.

The build material may have a melting point within the range of about 50° C. to about 400° C., or higher in the case of metal or ceramic powder build materials. Examples of build material include semi-crystalline thermoplastic materials with a wide processing window of greater than 5° C. (i.e. the temperature range between the melting point and the re-crystallization temperature). For example, a polyamide build material powder may be used (such as PA 11/nylon 11 which has a melting temperature of 205 degrees C., or PA 12/nylon 12 which has a melting temperature of 210 degrees C.), or thermal polyurethanes having a melting point ranging from about 100° C. to about 165° C., or the build material may be a liquid, a paste or a gel. Some specific example polyamide (PA) build materials include PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc. Other specific examples of the build material include polyethylene, polyethylene terephthalate (PET), and amorphous variations of these materials. Still other examples of suitable build materials include polystyrene, polyacetals, polypropylene, polycarbonate, polyester, thermal polyurethanes, other engineering plastics, and blends of any two or more of the polymers listed herein. Core shell polymer particles of these materials may also be used.

The build material may be made up of similarly sized particles or differently sized particles. In the examples shown herein, the build material includes particles of two different sizes. The term "size", as used herein, refers to the diameter of a spherical particle, or the average diameter of a non-spherical particle (i.e., the average of multiple diameters across the particle). In an example, the average size of the particles of the build material ranges from 5 μm to about 100 μm.

The above-described methods can be implemented to selectively apply a detailing agent on a portion of the build material outside an edge boundary of the object being manufactured, and to avoid using detailing agent when printing some or all internal structural features Having deposited the printer control fluids, the build material is exposed to radiation that generates heat to at least partially fuse the portion of the build material in contact with the fusing agent, wherein the detailing agent inhibits fusing of other portions of the build material in contact with the detailing agent.

There are various additional methods and systems within the scope of the claims of this patent specification. In one example method, the printer control instructions comprise instructions to control the three-dimensional printing apparatus to: analyze data representing a three-dimensional object to select printer control fluid parameters for generating a first subset of the identified internal structure features; and to select different printer control fluid parameters for generating a second subset of the identified internal structure features. There could be several different types of structural feature that are identifiable within object models and which would benefit from the use of different printer control fluid parameters. The methods described herein are not limited to use of a single set of printer control fluid parameters for all internal features and a single set for all external features, as a range of different printer control fluid parameters may be selected for different feature types within an object. In some examples, an operator of a 3D printing apparatus is provided with the option to select an amount of detailing agent in a range from 0 to 255 contone in order to control the amount of additional fusing that is allowed.

The examples described above vary the quantity of detailing agent, but other fusing control fluid parameters can be varied. For example, the same type and quantity of detailing agent may be applied but the fusing agent and temperature or fusing time may be changed. In each case, there is a selection of a first set of control fluid parameters in response to identification of a first type of structural feature such as internal structure features and types of features, and a different set of control fluid parameters is applied to other features.

The invention claimed is:

1. A method comprising:

receiving an object model representing an object to be additively manufactured by a three-dimensional printing apparatus depositing a plurality of layers of build material powder, selectively applying print agent to the layers, and selectively fusing the layers;

identifying internal features and external features of the object;

selecting a first set of print agent parameters for forming the internal features during additive manufacture of the object;

selecting a second set of print agent parameters for forming the external features during additive manufacture of the object; and causing the three-dimensional printing apparatus to additively manufacture the object such that the three-dimensional printing apparatus:

selectively applies the print agent in accordance with the first set of print agent parameters when forming the internal features, and selectively applies the print agent in accordance with the second set of print agent parameters when forming the external features.

2. The method according to claim 1, wherein identifying the internal features and the external features of the object comprises:

analyzing the object model to identify all features that are fully contained within an external shell of the object as the internal features, and to identify all features that are not fully contained within the external shell as the external features.

3. The method according to claim 2, wherein analyzing the object model to identify all the features that are fully contained within the external shell as the internal features and all the features that are not fully contained within the external shell as the external features comprises:

analyzing the object model to identify first and second types of the internal features, wherein the first set of print agent parameters comprises respective sub-sets of print agent parameters for the first and second types of the internal features.

4. The method according to claim 3, wherein the first type of the internal features comprises internal walls of the object and the second type of the internal features comprises spaces between the internal walls of the object.

5. The method according to claim 1, wherein the first set of print agent parameters and the second set of parameters specify different amounts of detailing agent for respectively forming the internal features and the external features.

6. The method according to claim 5, wherein the first set of print agent parameters specifies no detailing agent for forming the internal features and the second set of print agent parameters specifies a non-zero amount of detailing agent for forming the external features.

7. The method according to claim 1, wherein the first set of the print agent parameters and the second set of print agent parameters specify different amounts of detailing agent for respectively forming an internal feature and an external feature that are otherwise identical other than the internal feature being fully contained within an external shell of the object and the external feature not being fully contained within the external shell.

8. A non-transitory computer-readable data storage medium storing program code executable by a processor to perform processing comprising:

receiving an object model representing an object to be additively manufactured by a three-dimensional printing apparatus depositing a plurality of layers of build material powder, selectively applying print agent to the layers, and selectively fusing the layers; identifying internal features and external features of the object;

selecting a first set of print agent parameters for forming the internal features during additive manufacture of the object;

selecting a second set of print agent parameters for forming the external features during additive manufacture of the object;

generating instructions for the three-dimensional printing apparatus to additively manufacture the object such that the three-dimensional printing apparatus:

selectively applies the print agent in accordance with the first set of print agent parameters when forming the internal features, and selectively applies the print agent in accordance with the second set of print agent parameters when forming the external features; and sending the instructions to the three-dimensional printing apparatus to additively manufacture the object in accordance therewith.

9. The non-transitory computer-readable data storage medium according to claim 8, wherein identifying the internal features and the external features of the object comprises:

analyzing the object model to identify all features that are fully contained within an external shell of the object as the internal features, and to identify all features that are not fully contained within the external shell as the external features.

10. The non-transitory computer-readable data storage medium according to claim 8, wherein the first set of print agent parameters and the second set of parameters specify different amounts of detailing agent for respectively forming the internal features and the external features.

11. The non-transitory computer-readable data storage medium according to claim 10, wherein the first set of print agent parameters specifies no detailing agent for forming the internal features and the second set of print agent parameters specifies a non-zero amount of detailing agent for forming the external features.

12. The non-transitory computer-readable data storage medium according to claim 8, wherein the first set of the print agent parameters and the second set of print agent parameters specify different amounts of detailing agent for respectively forming an internal feature and an external feature that are otherwise identical other than the internal feature being fully contained within an external shell of the object and the external feature not being fully contained within the external shell.

13. A system comprising:

a processor; and a memory storing instructions executable by the processor to:

receive an object model representing an object to be additively manufactured by a three-dimensional printing apparatus depositing a plurality of layers of build material powder, selectively applying print agent to the layers, and selectively fusing the layers; identifying internal features and external features of the object;

select a first set of print agent parameters for forming the internal features during additive manufacture of the object;

select a second set of print agent parameters for forming the external features during additive manufacture of the object;

generate instructions for the three-dimensional printing apparatus to additively manufacture the object such that the three-dimensional printing apparatus:

selectively applies the print agent in accordance with the first set of print agent parameters when forming the internal features, and selectively applies the print agent in accordance with the second set of print agent parameters when forming the external features.

14. The system according to claim 13, wherein the internal features and the external features of the object are identified by:

analyzing the object model to identify all features that are fully contained within an external shell of the object as the internal features, and to identify all features that are not fully contained within the external shell as the external features.

15. The system according to claim 13, wherein the first set of print agent parameters and the second set of parameters specify different amounts of detailing agent for respectively forming the internal features and the external features.

16. The system according to claim 15, wherein the first set of print agent parameters specifies no detailing agent for forming the internal features and the second set of print agent parameters specifies a non-zero amount of detailing agent for forming the external features.

17. The system according to claim 13, wherein the first set of the print agent parameters and the second set of print agent parameters specify different amounts of detailing agent for respectively forming an internal feature and an external feature that are otherwise identical other than the internal feature being fully contained within an external shell of the object and the external feature not being fully contained within the external shell.

18. The system according to claim 13, further comprising the three-dimensional printing apparatus to additively manufacture the object in accordance with the generated instructions.

* * * * *